United States Patent
Goings

(10) Patent No.: US 10,842,078 B1
(45) Date of Patent: Nov. 24, 2020

(54) DUAL POWERED RIDING LAWN MOWER

(71) Applicant: Jovan Goings, Georgetown, SC (US)

(72) Inventor: Jovan Goings, Georgetown, SC (US)

( * ) Notice: Subject to any disclaimer, the term of this patent is extended or adjusted under 35 U.S.C. 154(b) by 0 days.

(21) Appl. No.: 16/939,533

(22) Filed: Jul. 27, 2020

(51) Int. Cl.
| | |
|---|---|
| *A01D 34/03* | (2006.01) |
| *A01D 69/02* | (2006.01) |
| *B60L 15/30* | (2006.01) |
| *A01D 34/64* | (2006.01) |
| *A01D 69/08* | (2006.01) |
| *A01D 34/78* | (2006.01) |
| *A01D 101/00* | (2006.01) |

(52) U.S. Cl.
CPC ............ *A01D 69/02* (2013.01); *A01D 34/64* (2013.01); *A01D 34/78* (2013.01); *A01D 69/08* (2013.01); *B60L 15/30* (2013.01); *A01D 2101/00* (2013.01); *B60L 2200/40* (2013.01)

(58) Field of Classification Search
CPC ........ A01D 34/43; A01D 34/57; A01D 34/64; A01D 34/03; A01D 34/42; A01D 34/6806; A01D 34/78; A01D 69/02; A01D 69/08; A01D 69/025; A01D 69/005; A01B 51/026; B60L 15/30
USPC ........ 56/1, 2, 11.3, 13.5, 16.7, 249; 180/2.2; 280/7.15
See application file for complete search history.

(56) References Cited

U.S. PATENT DOCUMENTS

| | | | | |
|---|---|---|---|---|
| 1,713,396 | A * | 5/1929 | Rountree | A01D 34/43 56/16.7 |
| 3,630,010 | A * | 12/1971 | Rester | A01B 51/026 56/13.5 |
| 4,341,058 | A | 7/1982 | Chun | |
| 4,455,816 | A | 6/1984 | Porath | |
| 5,222,348 | A | 6/1993 | Woodling | |
| 5,274,987 | A | 1/1994 | Wiener | |
| 8,905,900 | B1 * | 12/2014 | Scaringi | B62K 5/003 482/57 |
| 2007/0000222 | A1 | 1/2007 | Lawbaugh | |
| 2011/0232254 | A1 * | 9/2011 | Ju | A01D 34/57 56/249 |

* cited by examiner

*Primary Examiner* — Robert E Pezzuto
(74) *Attorney, Agent, or Firm* — Boudwin Intellectual Property; Daniel Boudwin

(57) ABSTRACT

A dual powered riding lawn mower including a riding mower. The riding mower includes a mowing deck having at least one mowing blade therein. The mower blade is connected to a blade shaft. The blade shaft is connected to a clutch and gear box. The gear box will enable a user to switch between manual power and a battery powered motor. The manual power will include a set of pedals that will spin the blade shaft and propel the riding lawn mower forward. When the electric motor is engaged the pedals are used to charge the battery via an alternator connected to the gear box.

17 Claims, 3 Drawing Sheets

DUAL POWERED RIDING LAWN MOWER

BACKGROUND OF THE INVENTION

The present invention relates to riding lawn mowers. More particularly, the present invention provides a lawn mower than can be used with an electric motor or with human power propelling the mower. Further, due to the power sources the mower will be significantly quieter than the traditional gas mowers.

Everyone with a yard will either need to mow it themselves or hire someone to tend to the ever-growing grass. The lawn care business is a booming business as a result. There have been many innovations in the art of mowing grass and keeping a property looking well groomed. A major innovation was the gas-powered mower. The gas-powered mower made it easier to keep grass at a desired length and reduce the amount of maintenance needed for a mechanical mower.

After the gas-powered mower, the riding lawn mower came to be. The riding mower allows an individual to mow large areas wall while seated on a self-propelled mowing device. These mowers are extremely loud and require gas to run properly. Often times, these mowers can run out of fuel in the middle of use. This will require the user to lug the fuel can over to the mower then back to the storing location. This can be extremely annoying.

Consequently, there is a need in for an improvement in the art of riding mowers. The present invention substantially diverges in design elements from the known art while at the same time solves a problem many people face when mowing their lawns. In this regard the present invention substantially fulfills these needs.

SUMMARY OF THE INVENTION

The present invention provides a dual powered riding lawn mower wherein the same can be utilized for providing convenience for the user when using a riding lawn mower. The dual powered riding lawn mower comprises a mower body, mower the body comprising a seat, a steering column, and a mower deck. The mower deck has at least one mower blade located therein, wherein the mower blade is attached to a blade shaft. The blade shaft is attached to a gear box. A set of manual pedals is operably attached to the mower body. A connector operably connects the pedals to the gear box. An electric motor is operably coupled within the mower body and is coupled to the gear box. The gear box has a clutch system that allows the mower to be switched from battery power to manual power.

Another object of the dual powered riding lawn mower is to provide a pair of rear wheels.

Another object of the dual powered riding lawn mower is to provide a pair of rear wheels that are operably coupled to the gear box.

Another object of the dual powered riding lawn mower is to provide a gear box that is operably coupled to the mower shaft and the pair of rear wheels to the power source.

Another object of the dual powered riding lawn mower is to have a battery and an alternator, wherein the alternator is coupled to the gear box.

Another object of the dual powered riding lawn mower is to have at least a pair of rear wheels.

Another object of the dual powered riding lawn mower is to have a selector operatively coupled to the gear box, wherein the selector can select a power source.

Another object of the dual powered riding lawn mower is to have the selector is set to manual power and the pedals mush be rotated to move the wheels and mower shaft.

Another object of the dual powered riding lawn mower is to have the manual power further spins the alternator charging the battery.

Another object of the dual powered riding lawn mower is to have the selector is set to electric motor power and the motor powers the wheels and mower shaft.

Another object of the dual powered riding lawn mower is to have the pedals still be rotated to operate the alternator.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
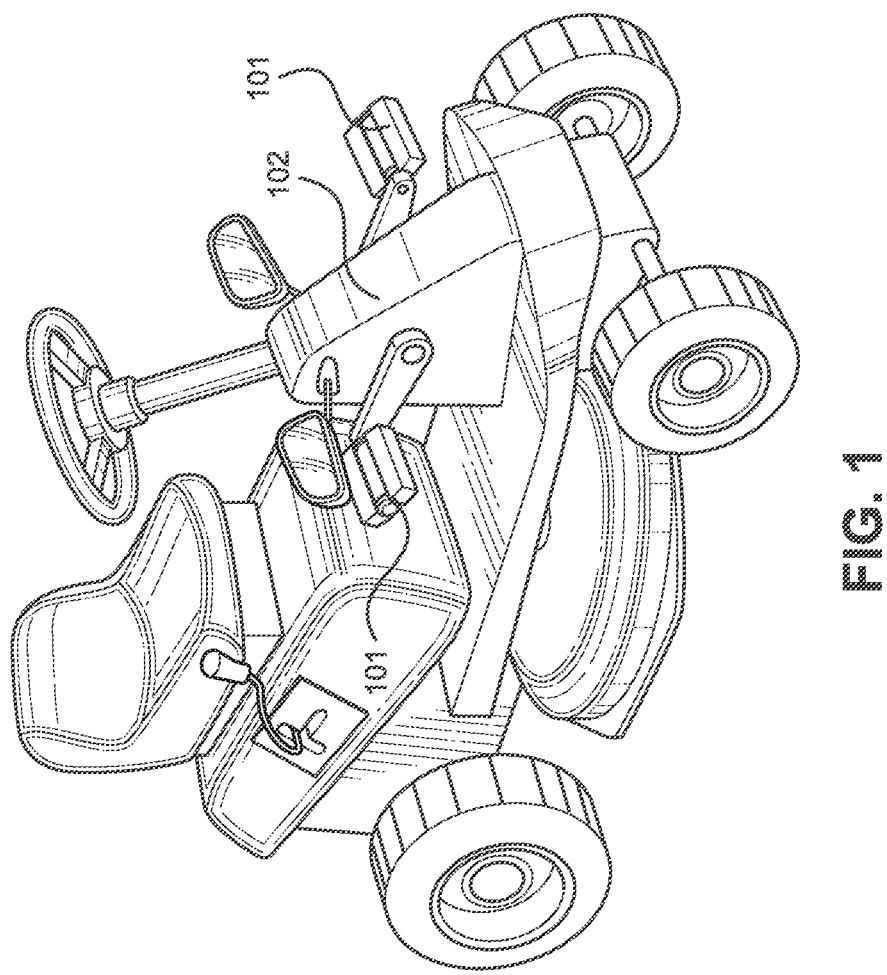
FIG. 1 shows a perspective view of an embodiment of the dual powered riding lawn mower.

Reference is made herein to the attached drawings. Like reference numerals are used throughout the drawings to depict like or similar elements of the dual powered riding lawn mower. For the purposes of presenting a brief and clear description of the present invention, a preferred embodiment will be discussed as used for the dual powered riding lawn mower. The figures are intended for representative purposes only and should not be considered to be limiting in any respect.

Referring now to FIG. 1, there is shown a perspective view of an embodiment of the dual powered riding lawn mower. The dual powered riding lawn mower is designed to have an electric engine and a manual propulsion method. In one embodiment, the mower has a pair of pedals 101 attached to the steering column 102. The pedals 101 will allow a user to operate the mower using manual power similar to that of a bicycle.

Figure 2:
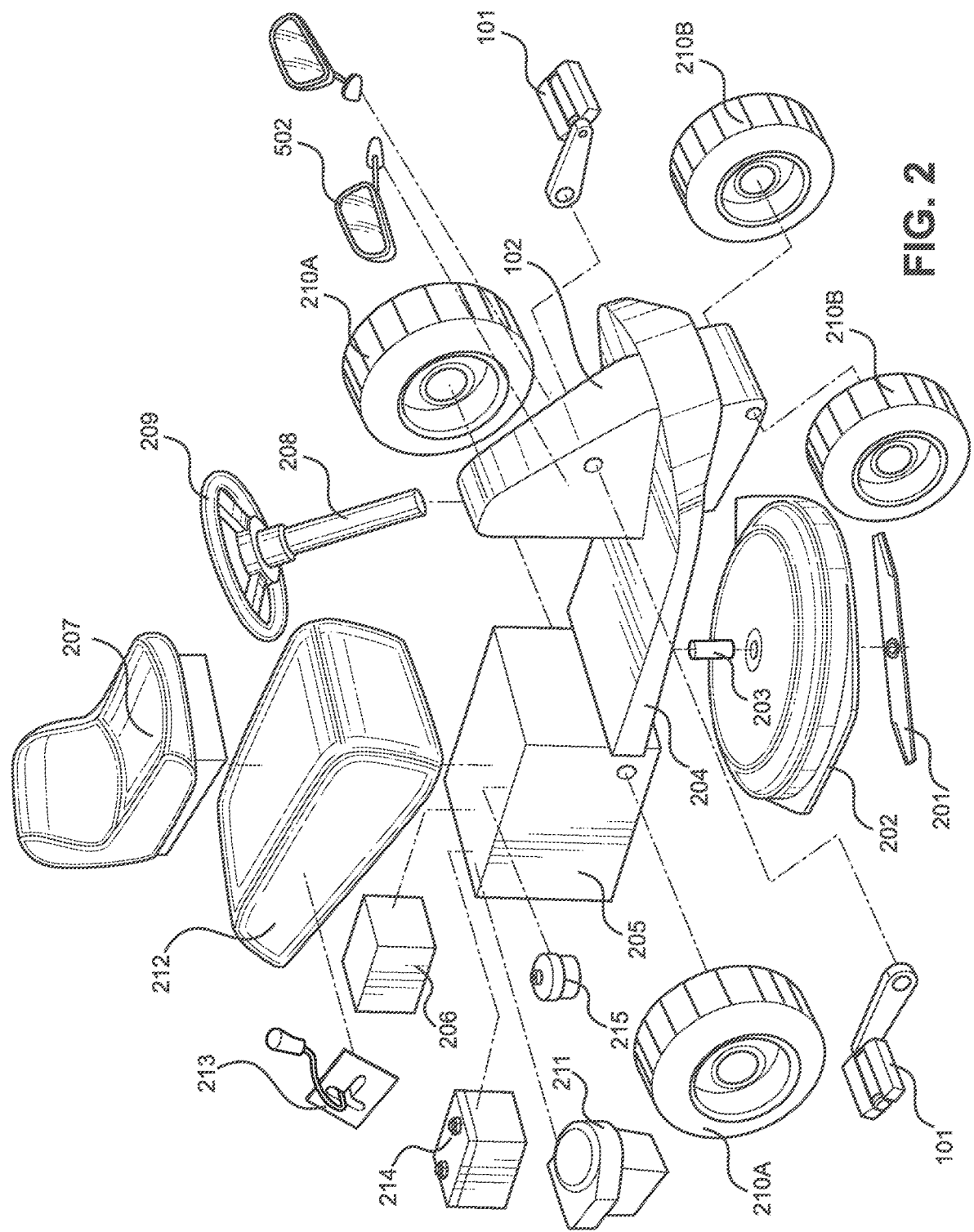
FIG. 2 shows an exploded view of an embodiment of the dual powered riding lawn mower.

Referring now to FIG. 2, there is shown an exploded view of an embodiment of the dual powered riding lawn mower. The dual powered riding lawn mower is comprised of a body 204. In one embodiment, the body 204 is a flat base plate that will allow for other objects to be attached thereto. In one embodiment, the body 204 is made from metal. The body 204 has a housing 205 attached thereto. In one embodiment, the housing 205 is located to the rear of the body 204. The housing 205 has a base and a plurality of side walls. In one embodiment, the body 204 serves as the base for the housing 205. The base and the side walls create an interior volume of the housing 205.

The housing 205 has within the interior volume a gear box 206, an electric engine 211, at least one battery 214, and an alternator 215. These parts will be operably coupled together as described in the embodiment represented by FIG. 4. The electric engine 211 is secured to the base of the housing 205. This will prevent the electric engine 211 from moving when in use. There is further at least one battery 214 located within the housing 205. The at least one battery 214 shall hold enough energy to operate the electric motor 211. The at least one battery 214 shall be removably secured within the housing 205. This will allow for the battery 214 to be removed and replaced when the battery 214 is depleted. This will prevent a user from having to replace the entire dual powered riding mower. There is further an alternator 215 located within the housing. The alternator 215 shall be capable of charging the at least one battery 214. In one embodiment, the alternator 215 is capable of charging the at least one battery 214 faster than the electric engine 211 can drain it due to the use of manual power to spin the alternator.

In one embodiment, the housing 205 further comprises a housing cover 212. The housing cover 212 is configured to be removably secured to a top portion of the housing 205. In one embodiment, the housing cover 212 is secured to the housing 205 using a plurality of hinges. In another embodiment, the housing cover 212 is secured to the housing 205 using a plurality of fasteners. In yet a further embodiment, the housing cover 212 can be configured to extend down the side walls of the housing. In a version of this embodiment, the housing cover 212 is secured using clasps.

The housing cover 212 has a seat 207 secured to the top portion thereof. The seat 207 will be positioned such that a user will be able to sit in the seat 207 and reach the pedals 101 of the dual powered riding lawn mower. In one embodiment, the seat 207 has a bottom portion and a seat back portion. This will afford the rider more comfort as they are mowing. In another embodiment, the seat 207 is styled more like a bicycle seat. This will make it easier to operate the pedals 101. The housing cover 212 has a selector 213 attached to the outside of the housing cover 212. The selector lever 213 is configured to enter into the housing 205 and be operably coupled to the gear box 206. This will allow a user to select what mode to place the dual powered riding lawn mower in as described in FIG. 4.

In one embodiment, the dual power riding lawn mower has a set of rear wheels 210A. In another embodiment, there is a set of rear wheels 210A and at least one front wheel 210B. In one embodiment, the set of rear wheels 210A is rotatably coupled to the housing 205. In another embodiment, the set of rear wheels 210A is rotatably coupled to the body 204. The set of rear wheels 210A is further coupled to the gear box as described by FIG. 3. In one embodiment, the rear wheels 210A supply the momentum to the dual powered riding lawn mower.

In one embodiment, there is a single front wheel 210B. In another embodiment there is a set of front wheels 210B. The at least one front wheel 210B is rotatably coupled to the body 204. The front wheels 210B are further coupled to a steering assembly. The steering assembly is located within the steering column 102. The steering column 102 is located through the body 204. This means that a portion of the steering column 102 will be located below the body 204. The steering column 102 has a steering rod 208 protruding from a top end thereof. The steering rod 208 is operably coupled to the steering assembly located within the steering column 102. The steering rod 208 has a steering wheel 209 attached to a top end thereof. This will allow the user to turn the at least one front wheel 210B using the steering wheel 209.

Further, there is at least one head light 502 secured to the steering column 102. In other embodiments the at least one head light 502 is secured to other sections of the mower.

The dual powered riding lawn mower has a mower deck 202 located beneath the body 204. The mower deck 202 is secured to the underside of the body 204. The mower deck 202 will have a top side, a side wall and an open bottom end. There is a blade shaft 203 that is placed vertically through the top side of the mower deck 202. The blade shaft 203 is operably coupled to the gear box 206 as described in FIG. 4. The blade shaft 203 is operably coupled at a second end to at least on mower blade 201. The mower blade 201 will be capable of rotating and cutting grass.

Figure 3:
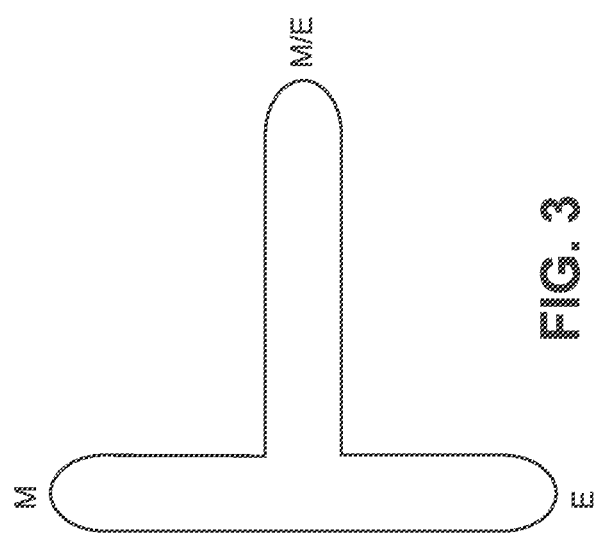
FIG. 3 shows a perspective view of an embodiment of the control panel for the dual powered riding lawn mower.

Referring now to FIG. 3, there is shown a perspective view of an embodiment of control panel for the dual powered riding lawn mower. The control panel is operated via a selector lever that will be attached thereto as seen in FIG. 2. The control panel is designed to allow the selector lever to be moved from a position to position as desired. In the shown embodiment, there are three desired positions. Each position represents a desired operation mode for the mower. In this embodiment, the three modes are manual power, electrical power, and electrical power with the alternator being manually spun and powered.

The control panel is configured such that moving the selector lever will move gears in the gear box. When the selector lever is moved to the desired position, the gears will also be moved to power the mower in the desired way. There can further be more desired operating modes. In one embodiment, there is further a clutch that will allow the selector lever to be moved and locked into place. In another embodiment, the mower will simply have to be stopped in order for the lever to be moved to a different position. In one embodiment, manual mode can also represent a parked mode as the mower will only move if the pedals are spun.

Figure 4:
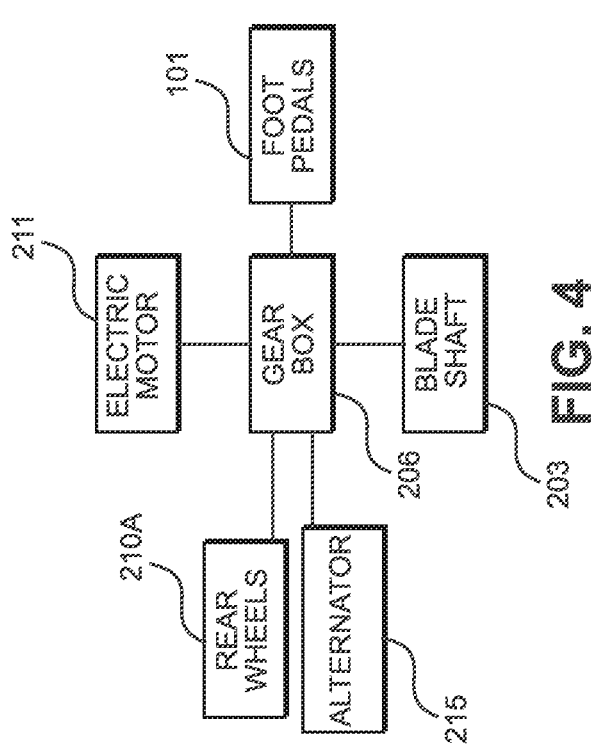
FIG. 4 shows a chart of an embodiment of the gear connections for the dual powered riding lawn mower.

Referring now to FIG. 4, there is shown a chart of an embodiment of the gear connections for the dual powered riding lawn mower. The gear box 206 is operably coupled the blade shaft 203. When the pedals 101 are turned, or the electric motor 211 is engaged the gear box 206 will spin the blade shaft 203. The gear box 206 if further operably coupled to the electric motor 211 and the foot pedals 101. The gear box 206 is further coupled to the rear wheels 210A. The gear box 206 is configured to engage the electric motor 211 or the foot pedals 101 using a series of gears, based upon the desired function. In one embodiment, there is a further series of gears that will allow the pedals 101 to operate the dual powered riding lawn mower while still spinning the alternator 215. The alternator is further coupled to the battery 214. This will allow the battery 214 to be charged by the alternator.

Figure 5:
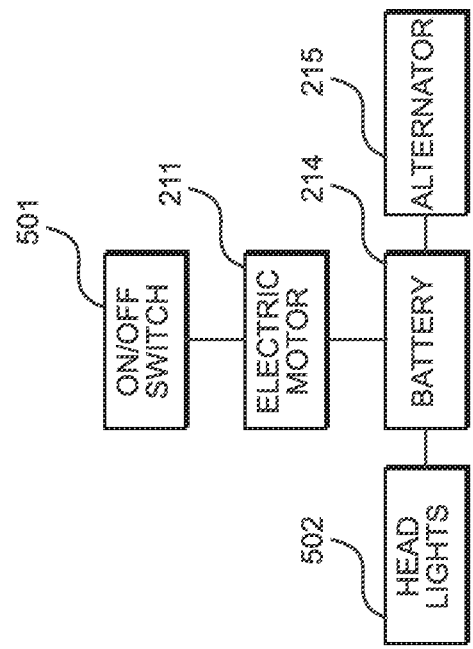
FIG. 5 shows an embodiment of a wiring diagram for the dual powered riding lawn mower.

Referring now to FIG. 5, there is shown an embodiment of a wiring diagram for the dual powered riding lawn mower. The dual powered riding lawn mower will have several electrical connections. There is at least one battery 214. In an embodiment where there is more than one battery 214, the batteries are connected in series. In another embodiment where there is more than one battery 214, the batteries are connected in parallel this will allow for more power to be stored without increasing the voltage. There will be at least one battery 214 that is electrically connected to the alternator 215. The alternator 215 will be capable of charging the at least one battery 214. In one embodiment, the battery 214 is electrically coupled to at least one head light 502. The at least one battery 214 is further coupled to the electric motor 211. The electric motor 211 is electrically coupled to a power switch 501. The power switch 501 will allow the electric motor 211 to be turned off and on.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dual powered riding lawn mower, comprising:
    a mower body, the body comprising a seat secured to a top rear portion of the body, a steering column secured to a top front side of the body, and a mower deck secured to the underside of the body;
    wherein the mower deck has at least one mower blade located therein, wherein the mower blade is attached to a blade shaft;
    wherein the blade shaft is attached to a gear box;
    wherein the gear box comprises a clutch system that allows the mower to be switched from battery power to manual power.

2. The dual powered riding lawn mower of claim 1, further comprising a pedal system, wherein the pedal system is operably coupled to the gear box.

3. The dual powered riding lawn mower of claim 1, further comprising an electric motor coupled to the blade shaft, wherein the electric motor is further coupled to a battery.

4. The dual powered riding lawn mower of claim 3, further comprising an alternator electrically coupled to the battery.

5. The dual powered riding lawn mower of claim 1, wherein the gear box is further attached to at least a pair of rear wheels, the rear wheels rotatably coupled to the mower body.

6. The dual powered riding lawn mower of claim 2, wherein the pedals are operably coupled to an alternator.

7. A dual powered riding lawn mower, comprising:
    a mower body, the body comprising a seat a steering column and a mower deck;
    wherein the mower deck has at least one mower blade located therein, wherein the mower blade is attached to a blade shaft;
    wherein the blade shaft is attached to a gear box;
    a set of manual pedals operably attached to the mower body;
    wherein a connector operably connects the pedals to the gear box;
    an electric motor operably coupled within the mower body and coupled to the gear box;
    wherein the gear box comprises a clutch system that allows the mower to be switched from battery power to manual power.

8. The dual powered riding lawn mower of claim 7, further comprising at least a pair of rear wheels.

9. The dual powered riding lawn mower of claim 8, wherein the pair of rear wheels are operably coupled to the gear box.

10. The dual powered riding lawn mower of claim 8, wherein the gear box operably couples the mower shaft and the pair of rear wheels to the power source.

11. The dual powered riding lawn mower of claim 7, further comprising a battery and an alternator, wherein the alternator is coupled to the gear box.

12. The dual powered riding lawn mower of claim 11, further comprising at least a pair of rear wheels.

13. The dual powered riding lawn mower of claim 12, further comprising a selector operatively coupled to the gear box, wherein the selector can select a power source.

14. The dual powered riding lawn mower of claim 13, wherein the selector is set to Manual power and the pedals mush be rotated to move the wheels and mower shaft.

15. The dual powered riding lawn mower of claim 14, wherein the manual power further spins the alternator charging the battery.

16. The dual powered riding lawn mower of claim 13, wherein the motor powers the wheels and mower shaft when the selector is set to select electric power.

17. The dual powered riding lawn mower of claim 16, wherein the pedal system is still rotatable to supply power when the selector is set to electric power.

* * * * *